Feb. 15, 1938.  A. KURTI  2,108,679
THRUST COLLAR
Filed May 12, 1936
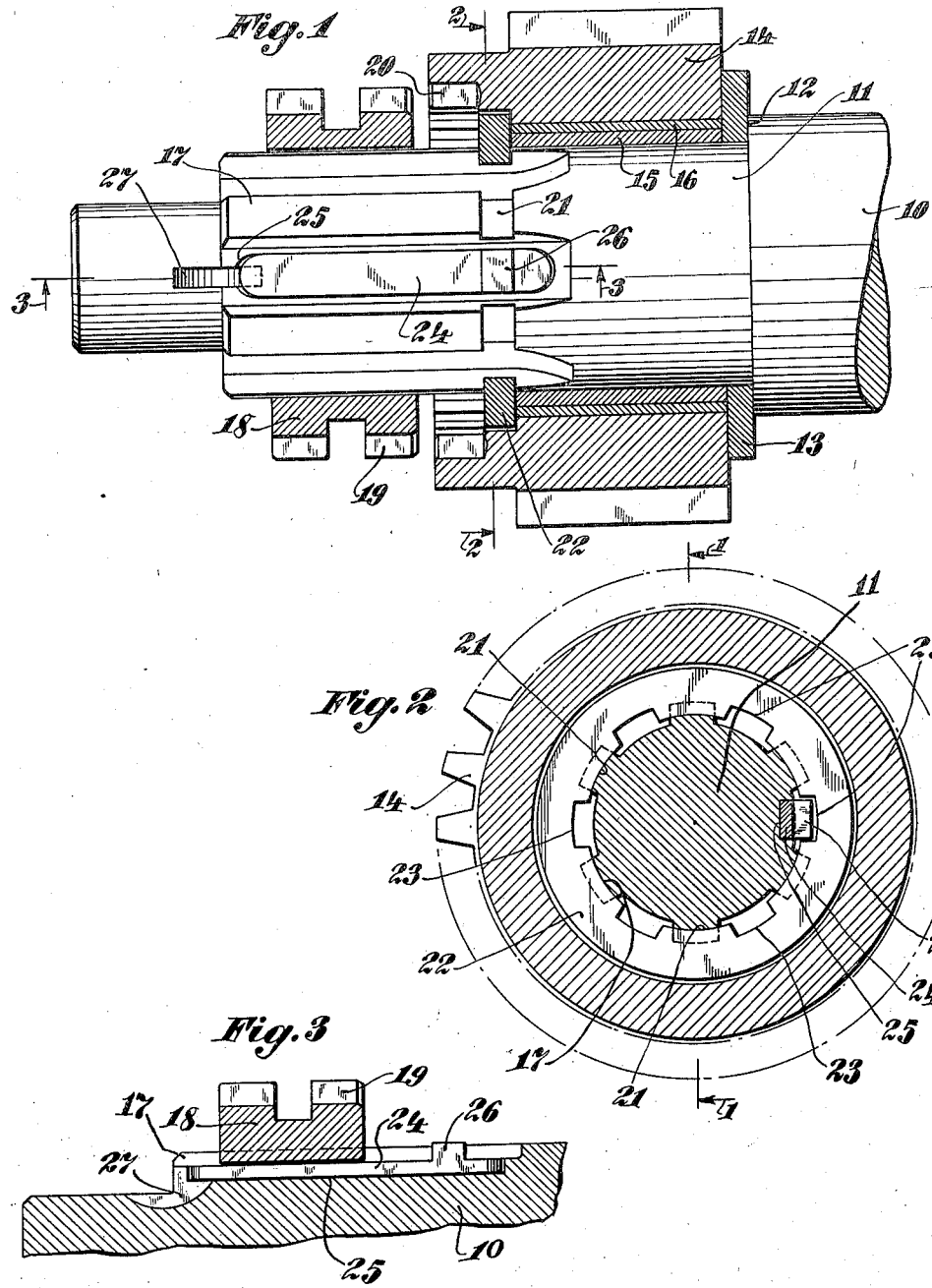
INVENTOR.
Aladar Kurti,
BY Hoguet, Neary & Campbell,
HIS ATTORNEYS Patented Feb. 15, 1938

2,108,679

UNITED STATES PATENT OFFICE 2,108,679

THRUST COLLAR

Aladar Kurti, Highland Park, N. J., assignor to Mack Manufacturing Corporation, a corporation of Delaware Application May 12, 1936, Serial No. 79,291

1 Claim. (Cl. 308—135)

The present invention relates to thrust washers and embodies, more specifically, an improved positioning and locking mechanism by means of which thrust collars may be secured effectively in a desired position, the collars functioning to resist predetermined thrust stresses to which they are subjected. The invention is particularly useful in connection with transmission mechanism wherein it is frequently desired to position gears in the mechanism and on supporting members upon which the gears are to partake of no axial motion.

Devices have heretofore been provided wherein spline thrust washers are utilized, these prior constructions providing for turning of the washer angularly in a groove so as to retain the same longitudinally on the shaft. In accordance with the present invention, it is proposed to provide a construction of this character which is much more simple and readily assembled and disassembled than in the prior constructions.

A further object of the invention is to provide, in combination with a gear and clutch mechanism for securing the gear non-rotatably to the shaft upon which the gear is mounted, a thrust washer and locking mechanism therefor which utilizes the clutch mechanism to retain the same in a desired locked position.

A further object of the invention is to provide, in combination with a thrust washer locking mechanism of the above character, a locking mechanism constructed in such fashion as to permit easy removal of the elements thereof after the sliding clutch has been removed. In this connection, it is proposed to utilize a locking key which is received within the spline formation upon which the sliding clutch is slidably mounted.

A further object of the invention is to provide, in combination with a locking mechanism of the above character, a shaft formation of such character as to facilitate the removal of the locking mechanism. In the embodiment shown herein, this element takes the form of a slot which is formed within the shaft and within which a suitable tool may be inserted to facilitate removal of the locking mechanism.

By reason of the construction provided herein, the length of the transmission mechanism may be reduced to a minimum inasmuch as no additional length is required therein to provide for the lock key which holds the thrust washer in place.

Further objects will be apparent as the invention is described in further detail in connection with the accompanying drawing, wherein Figure 1 is a view in vertical section, taken through a thrust washer locking mechanism constructed in accordance with the present invention, the section being taken on line 1—1 of Figure 2, and looking in the direction of the arrows;

Figure 2 is a view in transverse section taken on line 2—2 of Figure 1, and looking in the direction of the arrows; and Figure 3 is a segmental view in section, taken on line 3—3 of Figure 1, and looking in the direction of the arrows.

With reference to the above drawing, a shaft is shown at 10 and is formed with a reduced portion 11 providing a shoulder 12 against which a thrust collar 13 engages. A gear 14 is adapted to be rotatably mounted upon the reduced portion 11 of shaft 10, being mounted upon a sleeve 15 and a suitable bushing 16.

Beyond the reduced portion 11, the shaft is splined as indicated at 17 to receive a sliding clutch 18 having teeth 19 which are adapted to engage internal teeth 20 carried by the gear 14.

A groove 21 is formed in the splines 17 and is adapted to receive a thrust collar 22 which is formed with a plurality of notches 23, corresponding in size and spacing to the spline 17, in order that the thrust collar 22 may be inserted over the splines 17. When the collar 22 is positioned over the groove 21, turning the same axially into the position shown in Figure 2 will cause the collar to engage the groove 21 and thus prevent axial movement of the collar 22 with respect to the shaft 10.

In order that the collar may be locked in the position shown in Figure 2, a key 24 is provided, the key being received within a key way 25 which is formed in the spline section of the shaft 10, the key preferably lying in such fashion as not to interfere with the axial motion of the sliding clutch 18. A projection 26 is formed on the key 24, this projection being received within one of the notches 23 in order to prevent turning of the collar 22 and the resulting displacement thereof from the position shown in Figure 2. It will be seen that the key 24 is thus effectively locked in position by the sliding clutch 18 and, as long as the sliding clutch is mounted on the spline section of the shaft 10, the key 24 and collar 22 cannot be removed. In order to facilitate removal of the key from the key way, the shaft 10 is provided with a recess 27 in which a suitable tool may be inserted to facilitate the engagement of the end of the key 24 and thus enable the same to be conveniently removed.

It will thus be seen that, after the gear 14 is inserted, the thrust collar 22 is slid over the spline section 17 and, after reaching the groove 21, it is turned into the position shown in Figure 2. The key 24 is then inserted in order that the projection 26 thereof may engage one of the notches 23 in the thrust collar 22 and lock the same in position. The sliding clutch 18 is then placed upon the spline section 17, thus holding the key in the locking position and preventing removal of the elements.

It will be seen that the foregoing construction is simple and permits the easy assembly and disassembly of the elements. Moreover, the locking key and key way, together with the adjacent shaft portion, are formed to permit easy removal of the locking elements after the sliding clutch has been removed. It will be obvious that the foregoing construction does not require any additional length of transmission over that required for the sliding clutch and gear, in this fashion providing a thrust collar and locking mechanism therefor which enables the length of the transmission to be reduced to a minimum.

While the invention has been described with specific reference to the construction shown in the accompanying drawing, it is not to be limited, save as defined in the appended claim.

I claim:

In combination with a shaft having a gear mounted rotatably thereon and having a splined section upon which a sliding clutch member is mounted to connect the gear to the shaft, a thrust collar to prevent axial movement of the gear on the shaft, said thrust collar having lugs and notches formed therein to receive the splines of the splined section and the splined section having a groove to receive the lugs between the notches of the collar, and a key having a projection to engage one of the notches in the collar, the splined section being formed with a key way extending beneath the sliding clutch member to receive the key and permit the key to lie flush with the surface of the splined section the keyway having an abutment at one end thereof to prevent axial motion of the key, whereby the sliding clutch member will hold the key in position.

ALADAR KURTI.